United States Patent

Miho et al.

[11] Patent Number: 5,913,488
[45] Date of Patent: Jun. 22, 1999

[54] SPIRAL CABLE REEL

[75] Inventors: Takao Miho, Kanagawa; Hiroshi Oishi, Tokyo, both of Japan

[73] Assignees: Nissan Motor Co., Ltd., Kanagawa; Niles Parts Co., Ltd., Tokyo, both of Japan

[21] Appl. No.: 08/972,713

[22] Filed: Nov. 18, 1997

Related U.S. Application Data

[63] Continuation of application No. 08/613,334, Mar. 11, 1996, abandoned.

[30] Foreign Application Priority Data

Mar. 20, 1995 [JP] Japan .................................. 7-087332

[51] Int. Cl.$^6$ ......................... B65H 75/38; B65H 23/04; H01R 39/00
[52] U.S. Cl. ......................... 242/388; 242/396.1; 439/15
[58] Field of Search ............................. 242/396.1, 384.7, 242/385.4, 388, 371, 378; 439/15

[56] References Cited

U.S. PATENT DOCUMENTS 5,377,626  1/1995  Kilsby et al. .................... 242/384.7 X

FOREIGN PATENT DOCUMENTS 2-86980   7/1990  Japan .
5-347175  12/1993 Japan .................................. 242/396.1
6-36845   2/1994  Japan .................................. 242/396.1

Primary Examiner—John Q. Nguyen
Attorney, Agent, or Firm—Ronald P. Kananen; Rader, Fishman, & Grauer

[57] ABSTRACT

In a spiral cable reel including a stator member, a rotor member rotatable with respect to the stator member, and a stopper, the stopper body has protrusions at its one end which are engageable with and disengageable from engaging holes which are formed in the protruded portion of the rotor member, and locking members which are engageable with and disengageable from bosses of the stator member. The stopper stops the relative rotation between the rotor member and the stator member, and correctly determines the positional relationship between the stator member and the rotor member, and maintains it unchanged during the installation of the spiral cable reel onto equipment.

11 Claims, 6 Drawing Sheets

Prior Art

SPIRAL CABLE REEL

This application is a continuation of application Ser. No. 08/613,334 filed Mar. 11, 1996, now abandoned.

BACKGROUND OF THE INVENTION

1. Field of the Invention

This invention relates to a spiral cable reel made up of a flat cable, which is used, for instance, for electrically connecting a stator member to a rotor member in case where a vehicle such as an automobile is equipped with an air bag system; and more particularly to a spiral cable reel of a type that is designed to temporarily stop the relative rotation between the rotor member and the stator member when it is installed on the vehicle body.

2. Related Art

Heretofore, for instance in installing an air bag system in a vehicle such as an automobile, a spiral cable reel is employed in which the stator member and the rotary member are electrically connected through a flat cable. In connecting the spiral cable reel to equipment such as a steering wheel, it is essential that the rotor member is turnable from the neutral position of the steering wheel both right and left to the same extent (about 2.5 to 3 turns). For this purpose, in general, a locking mechanism is widely employed for the cable reel, which correctly determines the positional relationship between the stator member and the rotor member and holds it unchanged. One example of the locking mechanism for the cable reel has been disclosed by Japanese Utility Model Kokai Publication No. 86980/1990.

Another example for correctly determining the positional relationship between the stator member and the rotor member and holding it unchanged is illustrated in FIG. 11. FIG. 11 is a perspective view showing a stopper which is adapted to temporarily stop the relative rotation of the stator member and the rotor member of the spiral cable reel. In FIG. 11, reference numeral 1 designates the stator member; and 2, the rotor member which is rotatably mounted with respect to the stator member 1. A spiral cable (not shown) is accommodated inside the rotor member 2 to form the spiral cable reel in combination with the stator member 1 and the rotor member 2. Further in FIG. 11, reference number 3 designates the stopper; 4, a positioning pin (or so-called "locate pin") provided at a predetermined position on the rotor member 2. When installed, the positioning pin 4 is fitted in an engaging hole formed in the steering wheel. Further in FIG. 11, reference numeral 5 designates an upright pillar provided at a predetermined position on the stator member 1; 6, a locking hole formed in the stopper 3, to engage with the positioning pin 4; and 7, a locking hole formed in the stopper 3, to engage with the upright pillar 5.

In order to correctly position and hold the stator member 1 and the rotor member 1 until the spiral cable reel is coupled to a body of the vehicle, the relative rotation of the stator member and the rotor member is temporarily suspended such that the locking hole 6 of the stopper 3 is engaged with the positioning pin 4 of the rotor member 2, while the engaging hole 7 of the stopper 3 is engaged with the upright pillar 5 of the stator member 1. Thereafter, in coupling the spiral cable reel to equipment such as a steering wheel, the stopper 3 is first removed with a predetermined external force to thereby eliminate the prevention of the relative rotation of the stator member 1 and the rotor member 2, and then the positioning pin 4 of the rotor member 2 is fitted in the engaging hole (not shown) of the steering wheel.

As was described above, in the spiral cable reel shown in FIG. 11, the relative rotation of the stator member 1 and the rotor member 2 is temporarily suspended with the stopper 3. Hence, in coupling the spiral cable reel to equipment such as a steering wheel, it is necessary to remove the stopper 3 by application of an external force thereby to eliminate the prevention of the relative rotation of the stator member 1 and the rotor member 2 before the coupling between the spiral cable reel and the equipment is completely finished. Hence, there is a high possibility that the rotor member 2 may turn during the reel coupling work. This turn of the rotor member 2 may give rise to the following problems:

(1) Adjustment must be so made that the positioning pin 4 of the rotor member 2 is correctly fitted in the engaging hole (not shown) of the steering wheel during the reel coupling work.

(2) If the positioning pin 4 of the rotor member 2 is fitted in the engaging hole (not shown) of the steering wheel at a position other than the predetermined neutral position (or "N" position) and the steering wheel is turned, then the flat cable (not shown) in the spiral cable reel may be broken.

Further, in a case where the air bag system is incorporated in the equipment such as a steering wheel, the steering wheel is filled up with the unit of the air bag system, and therefore it becomes impossible to visually check the positioning pin 4 of the rotor member 2 from outside. Therefore, the above-described problems (1) and (2) are liable to occur.

SUMMARY OF THE INVENTION

Accordingly, an object of the invention is to eliminate the above-described difficulties accompanying a spiral cable reel. More specifically, an object of the invention is to provide a spiral cable reel having a stopper which, at all times of the installation of the spiral cable reel onto equipment such as a automobile, can stop the relative rotation of the rotor member and the stator member, and correctly determine and maintain the positional relationship between the stator member and the rotor member.

The foregoing object of the invention has been achieved by the provision of a spiral cable reel comprising:

a stator member;

a rotor member mounted in such a manner that the rotor member is rotatable with respect to the stator member; and a stopper for stopping the rotation of the rotor member with respect to the stator member, in which, according to the invention, the stator member and the rotor member include first and second engaging means, respectively, and the stopper comprises:

a lever-like stopper body;

first stopper means which are provided at one end of the stopper body in such a manner as to be engageable with and disengageable from the first engaging means, and second stopper means which are provided at the one end of the stopper body in such a manner as to be engageable with and disengageable from the second engaging means.

With the spiral cable reel of the invention, the first stopper means and the second stopper means formed at one end of the stopper body can be engaged with the first and second engaging means of the stator member and the rotor member while watching them carefully. Hence, in temporarily preventing the relative rotation of the rotor member and the stator member, the positional relationship between those members can be suitably determined and maintained unchanged.

In eliminating the prevention of the relative rotation of the stator member and the rotor member, merely by drawing the stopper body with a predetermined external force, the first stopper means and the second stopper means are disengaged from the first and second engaging means of those members. Thus, the prevention of the relative rotation of the rotor member and the stator member can be eliminated with ease.

In a preferred embodiment of the invention, the first engaging means of the stator member comprises a plurality of bosses which are protruded from the stator member at predetermined intervals. Hence, the first stopper means of the stopper body can be engaged with the bosses while watching them.

In the preferred embodiment, the second engaging means of the rotor means comprises a plurality of engaging holes which are formed in the upper surface of the rotor member at predetermined intervals. Hence, the second stopper means of the stopper body can be engaged with the engaging holes while watching them. This contributes to improvement in the work efficiency in the reel coupling work. The engaging holes, being formed in the protruded portion on the upper surface of the rotor member, can be watched carefully.

In the preferred embodiment, the interval between the bosses in the first engaging means of the stator member is larger than the interval between the engaging holes in the second engaging means of the rotary member. In the case where the first and second stopper means of the stopper body are engaged with the bosses of the first engaging means of the stator member and the engaging holes of the second engaging means of the rotor member, the insertion of the stopper body can be achieved with ease, because the distance between the bosses is different from that between the engaging holes. Thus, the work efficiency can be improved further.

In the preferred embodiment, the second engaging means is a lead-in and lead-out section of the spiral cable which is arranged in a hollow region which is formed by the stator member and the rotor member. The second engaging means of the rotor means serves also as the lead-in and lead-out section for the spiral cable; that is, it is not a one which is formed additionally only for the purpose of the temporary prevention of the relative rotation. Thus, the cost of metal molds can be reduced.

In the preferred embodiment, the first engaging means of the stator member has guide means for guiding the first stopper means towards the bosses. The first stopper means of the stopper can be readily guided towards the bosses by inserting the first stopper means along the guide means of the first engaging means of the stator member.

The present invention further provides a spiral cable reel for electrical comprising:

a stator member;

a rotor member rotatable about an axis with respect to the stator member; and stopper means temporality retained on both the stator member and the rotor member for preventing relative rotation between the rotor member and the stator member, wherein the stopper means is removed from the rotor member and the stator member upon the stopper means is moved along a plane orthogonal to the axis, to thereby permit the relative rotation between the rotor member and the stator member.

Since the stopper means can be removed from said stator member and rotor member by the movement of the stopper member along the plane orthogonal to the axis, the working efficiency can be improved. In the preferred embodiment, a radial movement of the stopper means with respect to the rotor member releases the elastic retainment of the stopper member to permit the relative rotation between the rotor member and the stator member.

BRIEF DESCRIPTION OF THE DRAWINGS

FIGS. 5A, 5B and 5C are a plan view, a side view, and another side view, respectively, showing the stopper.

DETAILED DESCRIPTION OF THE PREFERRED EMBODIMENT

A preferred embodiment of the invention will be described with reference to the accompanying drawings.

Figure 1:
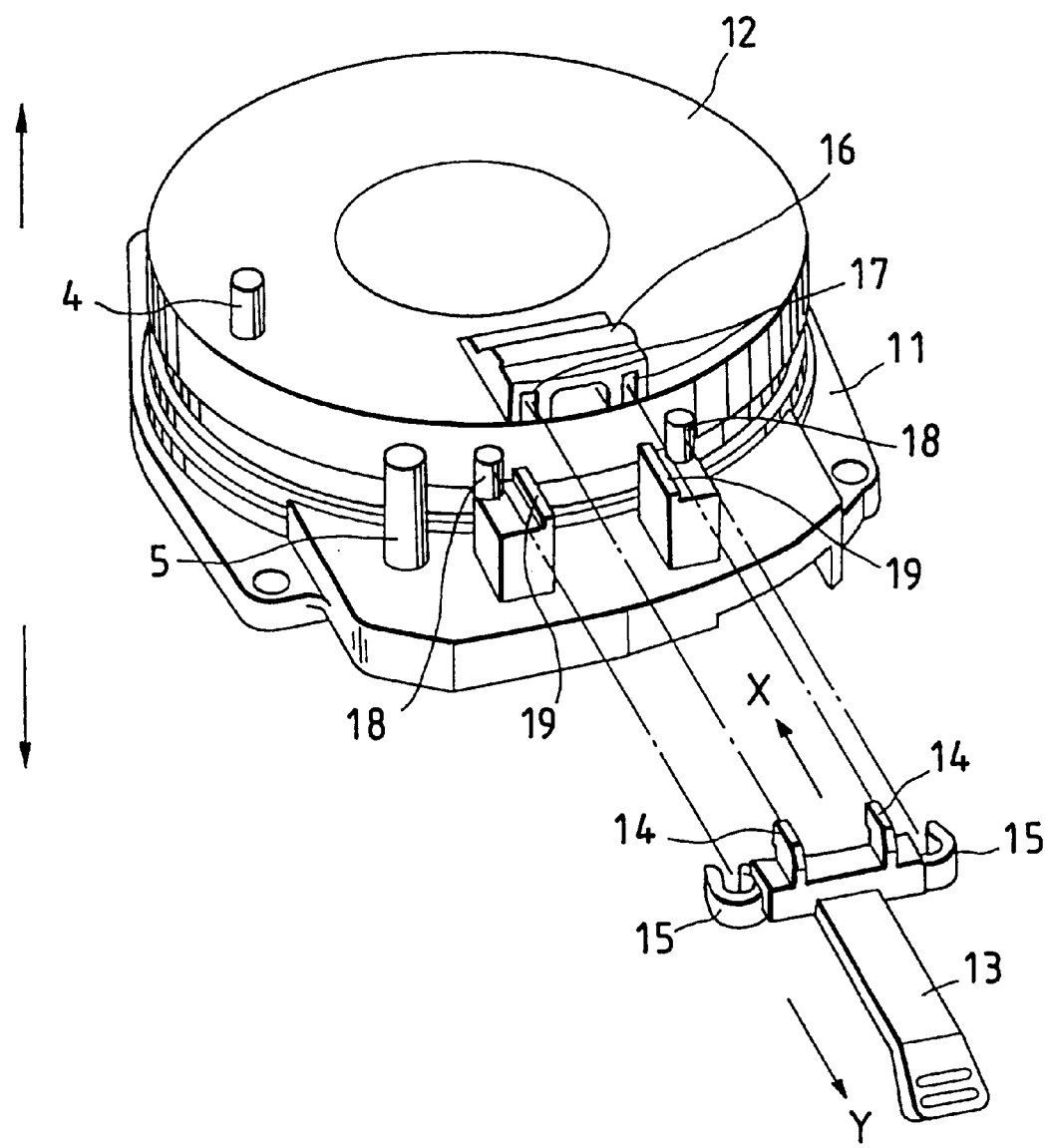
FIG. 1 is a perspective view showing a stopper, and a spiral cable reel made up of a stator member and a rotor member to which the stopper is applied, which constitutes an embodiment of the invention.

FIG. 1 is a perspective view showing a spiral cable reel made up a stator member and a rotor member to which a stopper is applied, which constitutes an embodiment of the invention. In FIG. 1, reference numeral 11 designates the stator member; and 12, the rotor member which is rotatable with respect to the stator member 11. A spiral cable (not shown) is accommodated within a hollow region defined by the stator member 11 and the rotor member 12 to form the spiral cable reel in combination with the stator member 11 and the rotor member 12. Further in FIG. 1, reference numeral 4 designates a positioning pin (or so-called "locate pin") which is provided at a predetermined position on the rotor member. When mounted on a steering post, the pin 4 is fitted in an engaging hole (not shown) of a steering wheel. Further in FIG. 1, reference numeral 5 designates an upright pillar at a predetermined position on the stator member 11.

Further in FIG. 1, reference numeral 13 designates a stopper body; 14, two protrusions formed at one end of the stopper body in such a manner that they are protruded forwardly (hereinafter referred to as "second stopper means 14", when applicable); 15, two locking members which are also formed on the same end of the stopper body 13. More specifically, the locking members 15 are extended from the outside of the lower portions of the protrusions 14, respectively (hereinafter referred to as "first stopper means 15", when applicable). The stopper body 13, the two protrusions 14, and the two locking members 15 are formed as a one-piece member with soft elastic material such as plastics. Reference numeral 16 denotes a protruded section provided at a predetermined position on the rotor member 12, serving as a spiral cable lead-in and lead-out section for the spiral cable. Reference numeral 17 designates each of two engaging holes 17 formed in the protruded section 16 (hereinafter referred to as "second engaging means 17", when applicable). The engaging holes 17 are so shaped that they are engageable with and disengageable from the protrusions 14 of the stopper body 13. Reference numeral 18 designates each of two bosses 18 formed at predetermined positions on the stator member 11 (hereinafter referred to as "first engaging means 18" when applicable). The bosses 18 are so shaped that they are engageable with and disengageable from the locking members 15 of the stopper body 13. Further in FIG. 1, reference numeral 19 designates two locking guide sections which are adapted to guide the lower edge portions of the locking members 15 when the stopper body 13 is coupled to the reel (hereinafter referred to merely as "guide means 19", when applicable).

The stopper, which is made up of the stopper body 13, the protrusions 14, and the locking members 15 as shown in FIG. 1 is used to temporarily stop the relative rotation of the stator member 11 and the rotor member 12 of the spiral cable reel as follows:

First, the stopper body 13 is held with the hand, and an external force is applied to the stopper body 13 to push the latter 13 in the direction of the arrow X while the lower edge portions of the locking members 15 are being guided along the guide sections 19. As a result, the protrusions 14 of the stopper body 13 are engaged with the engaging holes 17 formed in the protruded portion 16 of the rotor member 12, to prevent the vertical movement and the rotation of the rotor member 12. At the same time, the locking members 15 of the stopper body 13 are elastically engaged with the bosses 18 to some extent, to thereby prevent the rotation of the rotor member 12. Thus, the relative rotation of the stator member 11 and the rotor member 12 is temporarily positively prevented, and the positional relationship between the stator member 11 and the rotor member 12 is suitably determined and maintained unchanged.

The prevention of the relative rotation of the rotor member and the stator member can be eliminated as follows:

First, the stopper body 13 is held with the hand, an external force is applied to pull the stopper body 13 in the direction of the arrow Y, so that the protrusions 14 of the stopper body 13 are disengaged from the engaging holes 17 formed in the protruded portions 16 of the rotor member 12, while the locking members 15 of the stopper body 13 which have been elastically engaged with the bosses 18 to some extent are disengaged from the latter 18. As a result, the prevention of the relative rotation of the rotor member and the stator member is eliminated.

As was described above, in order to prevent the relative rotation of the stator member 11 and the rotor member 12 (forming the spiral cable reel) with the stopper body 13, the stopper body 13 is pushed with the hand in the direction of the arrow X into the side portions of the stator member 11 and the rotor member 12; whereas in order to eliminate the prevention of the relative rotation of those members 11 and 12, the stopper member 13 is pulled in the direction of the arrow Y with the hand.

Figure 11:
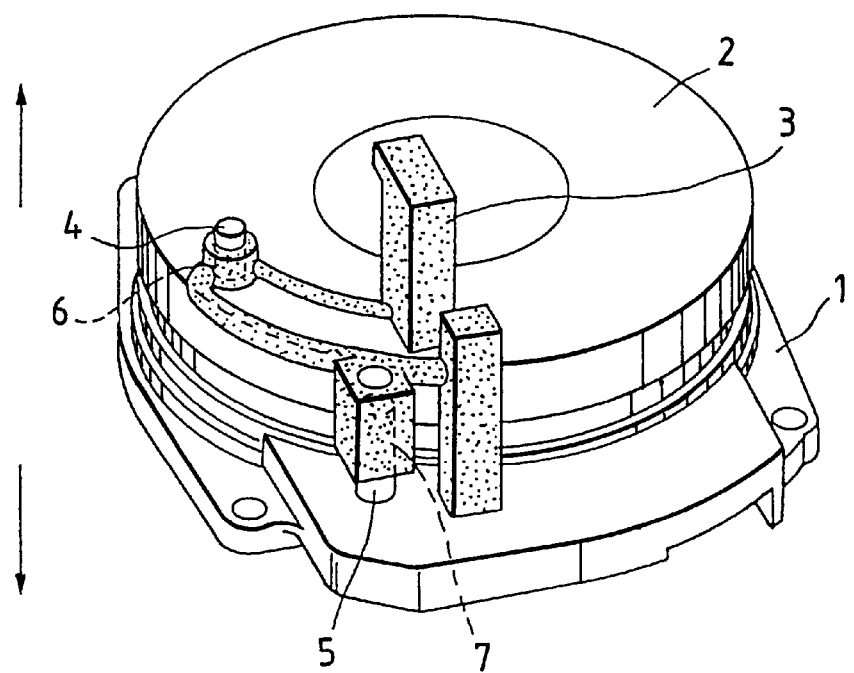
FIG. 11 is a perspective view showing an example of a spiral cable reel made up of a stator member and a rotor member, and equipped with a stopper adapted to temporarily stop the relative rotation of those members.

In the stopper of the invention, unlike the one shown in FIG. 11, the positioning pin 4 of the rotor member 12 is left as it is, with no additional member mounted thereon. Hence, during when the spiral cable reel is coupled to equipment such as a steering wheel, the positioning pin 4 of the rotor member 12 can be fitted in the engaging hole (not shown) of the steering wheel under the condition that the rotation of the rotor member 12 with respect to the stator member 11 is kept prevented. Hence, the spiral cable reel of the invention is free from the difficulty that the rotor member is carelessly turned during the reel coupling work. This means that the spiral cable reel coupling work can be achieved with higher efficiency.

Figure 2:
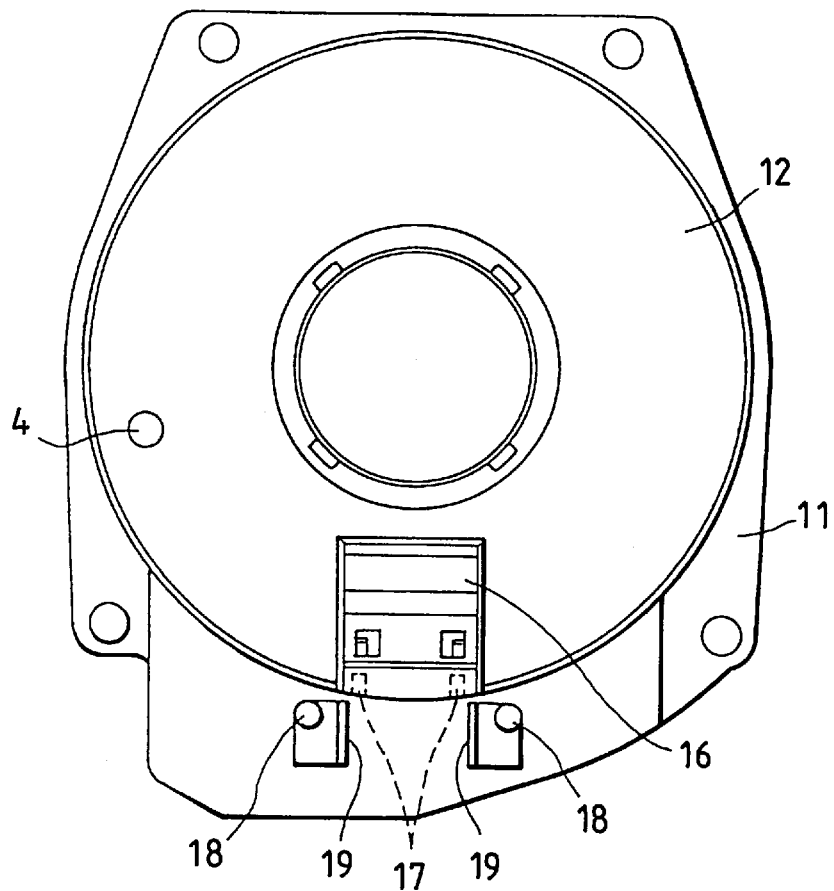
FIG. 2 is a plan view showing the spiral cable reel made up of the stator member and the rotor member, to which the stopper shown in FIG. 1 will be applied.
Figure 3:
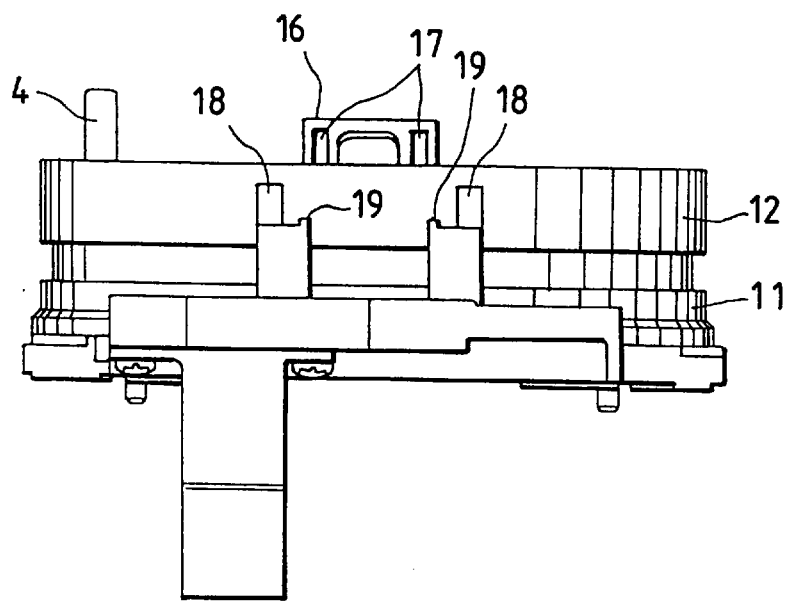
FIG. 3 is a side view of the spiral cable reel shown in FIG. 2.
Figure 4:
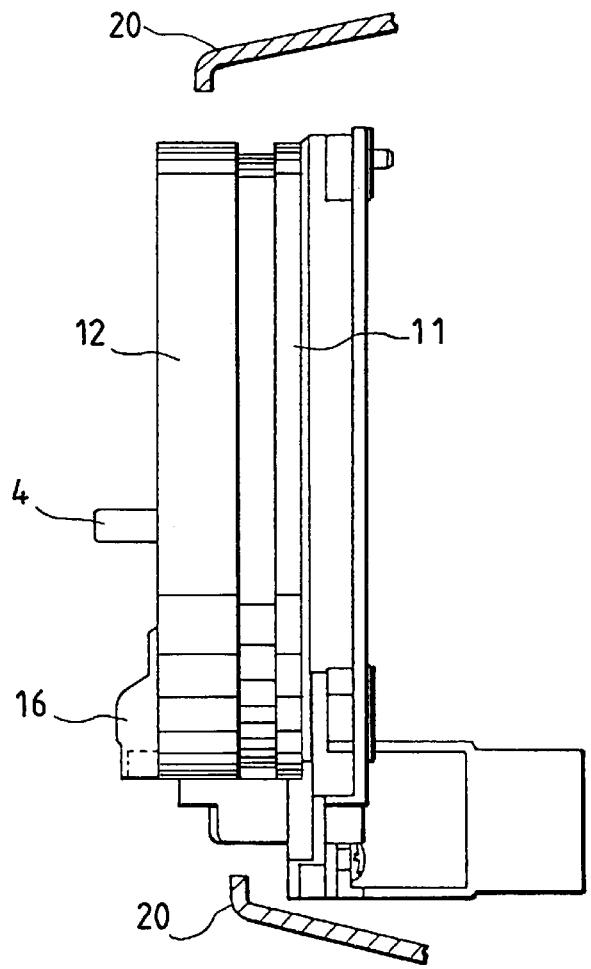
FIG. 4 is another side view of the spiral cable reel shown in FIG. 2.
Figures 5A, 5C:
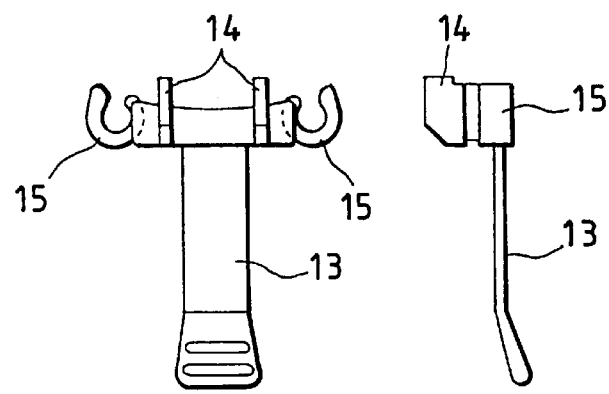
FIGS. 5A, 5B and 5C show the stopper illustrated in FIG. 1. More specifically.
Figure 5B:
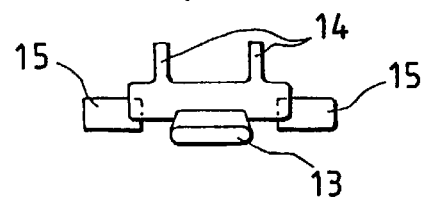
Figure 6:
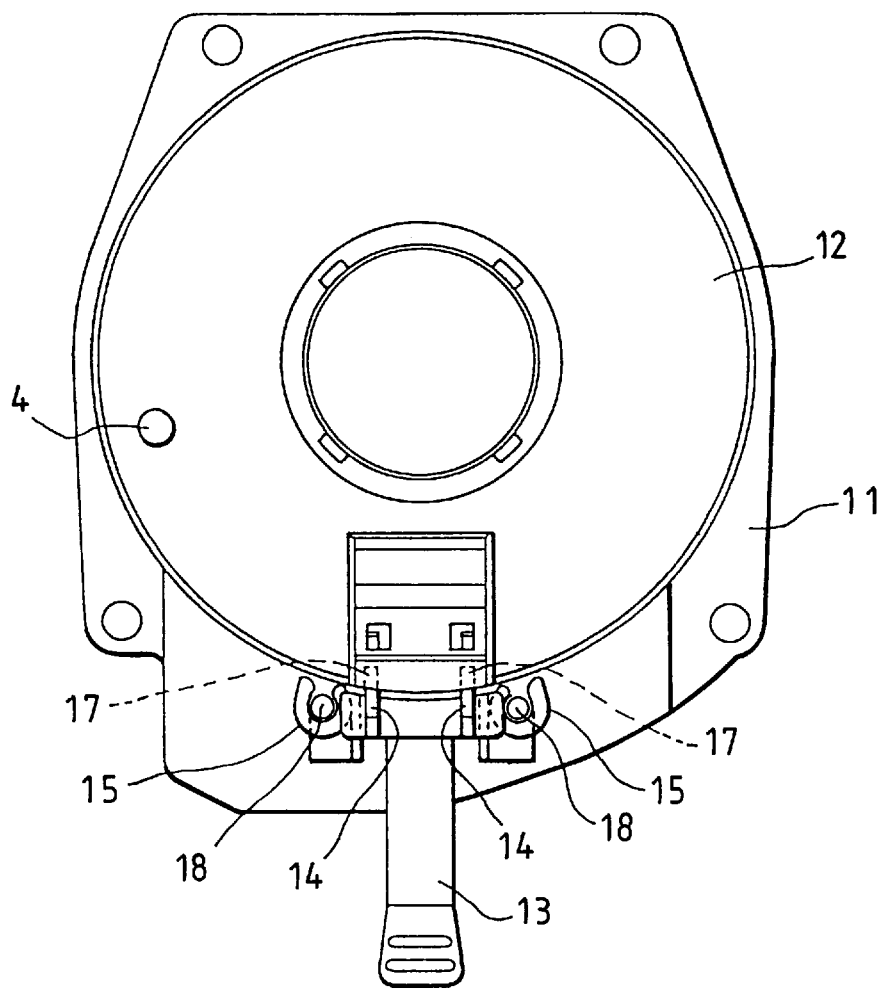
FIG. 6 is a plan view of the spiral cable reel comprising the stator member and the rotor member 12, the relative rotation of which is stopped with the stopper shown in FIG. 1.
Figure 7:
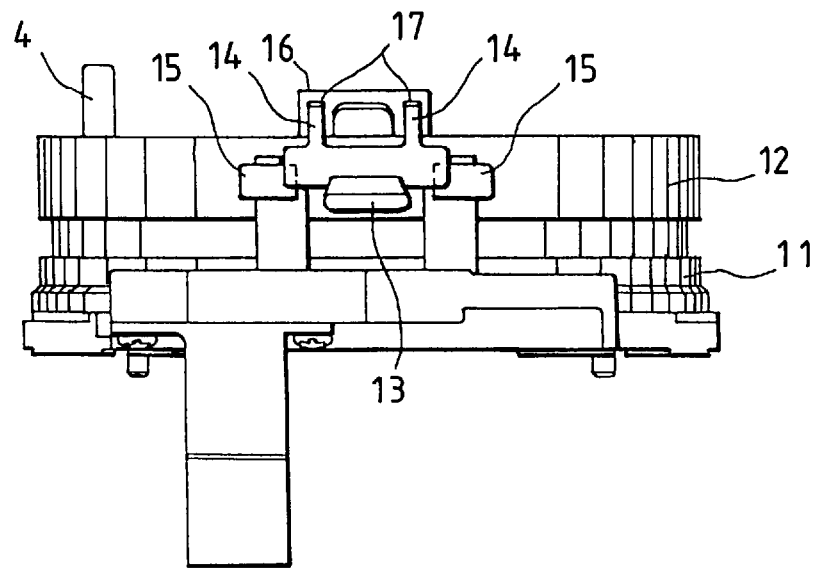
FIG. 7 is a side view of the spiral cable reel shown in FIG. 6.
Figure 8:
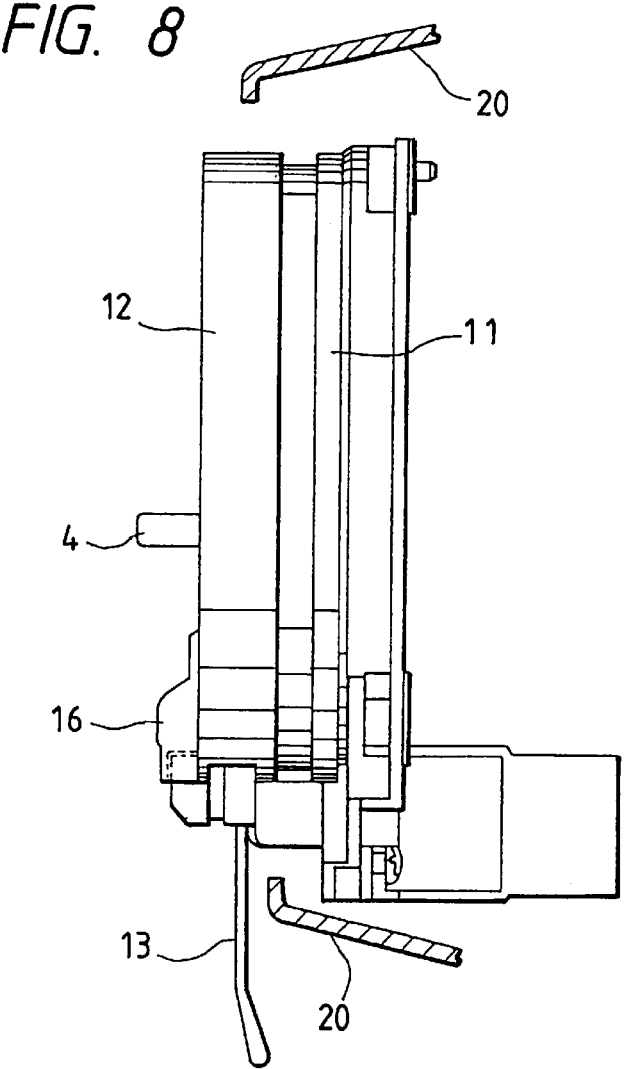
FIG. 8 is another side view of the spiral cable reel shown in FIG. 6.
Figure 9:
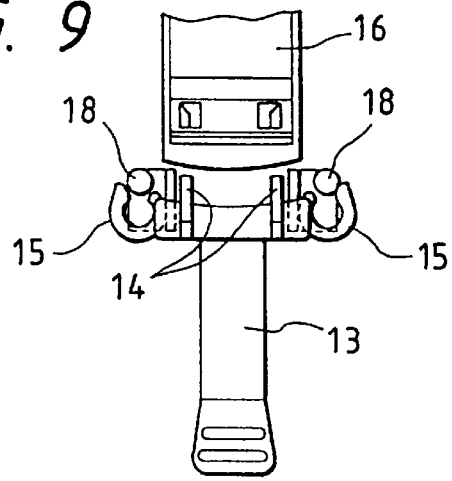
FIG. 9 is a plan view for description of the removal of the stopper from the spiral cable reel shown in FIG. 6.
Figure 10:
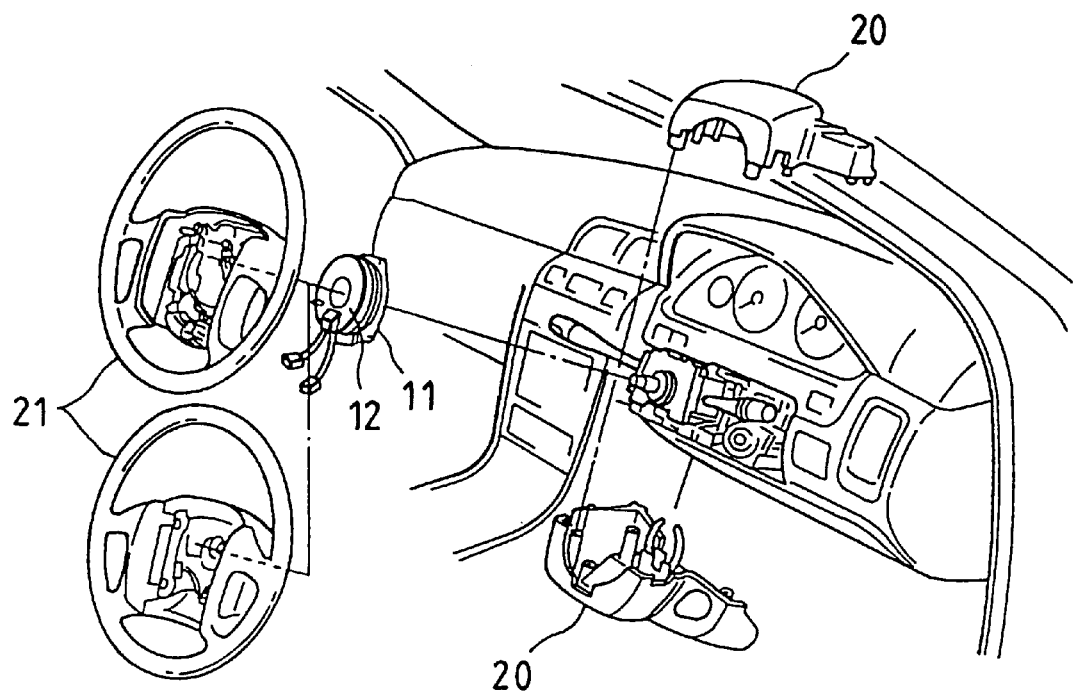
FIG. 10 is an exploded perspective view for a description of the work of coupling the spiral cable reel, for instance, to the vehicle body of an automobile in the installation of an air bag on the vehicle body.

FIG. 2 is a plan view showing the spiral cable reel made up of the stator member 11 and the rotor member 12 to which the stopper shown in FIG. 1 is applicable. FIG. 3 is a side view of the spiral cable reel shown in FIG. 2. FIG. 4 is another side view of the spiral cable reel shown in FIG. 2. FIGS. 5A to 5C are a plan view, a side view, and another side view showing the stopper shown in FIG. 1. FIG. 6 is a plan view of the spiral cable reel comprising the stator member and the rotor member 12 whose rotation is stopped with the stopper shown in FIG. 1. FIG. 7 is a side view of the spiral cable reel shown in FIG. 6. FIG. 8 is another side view of the spiral cable reel shown in FIG. 6. FIG. 9 is a plan view for description of the removal of the stopper from the spiral cable reel. FIG. 10 is an exploded perspective view for a description of the operation of coupling the spiral cable reel to the body of a vehicle such as an automobile, the spiral cable reel being employed for installation of an air bag system on the vehicle.

In FIGS. 2 through 10, parts corresponding functionally to those already described with reference to FIG. 1 are therefore designated by the same reference numerals or characters. In FIGS. 4, 8 and 10, reference numeral 20 designates a column cover adapted to cover the spiral cable reel made up of the stator member 11 and the rotor member 12; and 21, a steering wheel which is so designed as to accommodate the air bag system therein.

As was described above, the stopper of the invention is designed to stop the rotation of the rotator member 12 with respect to the stator member 11 (forming the spiral cable reel) by pushing the stopper body 13 into the side portions of the stator member 11 and the rotor member 12, and to release the prevention of the rotation of the rotation member 12 with respect to the stator member 11 by pulling the stator body 13 therefrom. Hence, in coupling the spiral cable reel to equipment such as a steering wheel, the positioning pin 4 of the rotor member 12 can be fitted in the engaging hole (not shown) of the steering wheel under the condition that the rotation of the rotor member 12 with respect to the stator member 11 is positively prevented with the stopper body 13. Hence, the spiral cable reel of the invention is free from the difficulty that the rotor member is carelessly turned during the reel coupling work. This means that the spiral cable reel coupling work can be readily and positively achieved; that is, the air bag mounting work can be achieved with high efficiency. Since the prevention of the rotation of the rotation member 12 with respect to the stator member 11 can be eliminated by pulling with an external force the stator body 13 which is located at a relatively narrow clearance between the column cover 20 and the steering wheel as shown in FIGS. 4 and 8, the prevention of the rotation of the rotor member 12 with respect to the stator member 11 can be readily eliminated by pulling the stopper body 13 outwardly with an external force through the relatively narrow clearance between the column cover 20 and the steering wheel (not shown) after the reel coupling work has been accomplished.

As was described above, the spiral cable reel of the invention is made up of: the stator member; the rotor member rotatable with respect to the stator member; and a stopper for stopping the relative rotation of the rotor member and the stator member. In the spiral cable reel, according to the invention, the stator member and the rotor member include the first and second engaging means, respectively, and the stopper comprises: the lever-like stopper body; the first stopper means which are provided at one end of the stopper body in such a manner as to be engageable with and disengageable from the first engaging means, and the second stopper means which are provided at the same end of the stopper body in such a manner as to be engageable with and disengageable from the second engaging means.

Hence, the first stopper means and the second stopper means formed at the one end of the lever-shaped stopper body can be engaged with the first and second engaging means of the stator member and the rotor member while watching them carefully. Hence, in temporarily preventing the relative rotation of the rotor member and the stator member, the positional relationship between those members can be suitably determined and maintained unchanged.

In eliminating the prevention of the relative rotation of the stator member and the rotor member, merely by drawing the stopper body with a predetermined external force the first stopper means and the second stopper means are disengaged from the first and second engaging means of those members. Thus, the prevention of the relative rotation of the stator member and the rotor member can be eliminated with ease.

In the spiral cable reel of the invention, the first engaging means of the stator member comprises a plurality of bosses which are formed on the stator member at predetermined intervals. Hence, in addition to the above-mentioned effects, the first stopper means of the stopper body can be engaged with the bosses while watching them carefully.

In the spiral cable reel, according to the invention, the second engaging means of the rotor means comprises a plurality of engaging holes which are formed in the upper surface of the rotor member at predetermined intervals. Hence, the reel has not only the above-noted effects but also the effect that the second stopper means of the stopper body can be engaged with the engaging holes while watching them carefully during the reel coupling work.

In the spiral cable reel according to the invention, the interval between the bosses in the first engaging means of the stator member is larger than that between the engaging holes in the second engaging means of the rotary member. Hence, the reel has not only the above-noted effects but also the effect that in the case where the first and second stopper means of the stopper body are engaged with the bosses of the first engaging means of the stator member and the engaging holes of the second engaging means of the rotor member, the insertion of the stopper body can be achieved with ease, because the distance between the bosses is different from that between the engaging holes.

In the spiral cable reel of the invention, the second engaging means is the lead-in and lead-out section for the spiral cable which is arranged in the hollow region formed by the stator member and the rotor member. Therefore, the second engaging means is not what is formed additionally for the temporary prevention of the relative rotation, which contributes to reduction in the cost of metal molds.

In the spiral cable reel of the invention, the first engaging means of the stator member has the guide means for guiding the first stopper means towards the bosses. Hence, the first stopper means of the stopper can be readily guided towards the bosses by inserting the first stopper means along the guide means of the first engaging means of the stator member.

What is claimed is:

1. A spiral cable reel comprising:
    a stator member having a first engaging portion;
    a rotor member rotatably arranged on said stator member about an axis and having a second engaging portion; and
    a stopper for stopping relative rotation between said rotor member and said stator member when said stopper is retained on said stator member and said rotor member, said stopper including:
        an elongated stopper body which extends beyond said rotor member and said stator member in a direction orthogonal to said axis when said stopper is engaged with said stator member and said rotor member;
        a first stopper portion provided at one end of said stopper body and adapted to be detachably engaged with said first engaging portion, said first stopper portion is adapted to be disengaged from said first engaging portion by a single movement of said stopper, said movement being entirely in a direction away from said axis in a plane orthogonal to said axis; and
        a second stopper portion provided at said one end of said stopper body and adapted to be detachably engaged with said second engaging portion, said second stopper portion is adapted to be disengaged from said second engaging portion by said single movement of said stopper in said direction away from said axis in said plane orthogonal to said axis.

2. A spiral cable reel as claimed in claim 1, wherein said first engaging portion of said stator member includes a pair of bosses provided upright on said stator member.

3. A spiral cable reel as claimed in claim 2, wherein said first engaging portion of said stator member has a guide for guiding said first stopper portion towards said bosses.

4. A spiral cable reel as claimed in claim 2, wherein said second engaging portion of said rotor member includes a pair of engaging holes formed in an upper surface of said rotor member.

5. A spiral cable reel as claimed in claim 4, wherein a distance between said bosses is larger than a distance between said engaging holes.

6. A spiral cable reel as claimed in claim 1, wherein said second engaging portion comprises a lead-in and lead-out section for a spiral cable which is arranged in a hollow region defined by said stator member and said rotor member.

7. A spiral cable reel as claimed in claim 1, wherein said second engaging portion of said rotor member includes a pair of engaging holes formed in an upper surface of said rotor member.

8. A spiral cable reel comprising:
    a stator member;
    a rotor member rotatable about an axis on said stator member; and
    a stopper for preventing relative rotation between said stator member and said rotor member when said stopper is retained on said stator member and said rotor member, said stopper including:
        first and second stopper portions, wherein said first and second stopper portions are adapted to be releasably engage said stator member and said rotor member, respectively, such that said stopper can be disengaged from said stator member and said rotor member by a single motion of said stopper, said motion being entirely along a plane orthogonal to said axis.

9. A spiral cable reel as claimed in claim 8, wherein said first and second stopper portions are disengaged from said stator member and said rotor member, respectively, when said stopper is removed from said stator member and said rotor member in a radial direction on said plane with respect to said rotor member.

10. A spiral cable reel comprising:

a stator member;

a rotor member rotatable with respect to said stator member;

a stopper for preventing relative rotation between said stator member and said rotor member when said stopper is retained on said stator member and said rotor member, said stopper including first and second stopper portions for removably engaging said stator member and said rotor member, respectively;

a pair of bosses extending parallel to an axis about which said rotor rotates, said bosses being located on a portion of said stator member; and a pair of engaging holes, each formed on an upper portion of said rotor member and directed radially outward with respect to said rotor member, wherein:

said first stopper portion engages said bosses for retaining said stopper on said rotor member and said stator member, said second stopper portion being inserted into said engaging holes.

11. A spiral cable reel as claimed in claim 10, wherein said first stopper portion includes a pair of substantially C-shaped, elastically deformable portions, each having an opening, wherein said openings permit said first stopper portion to be removed from said bosses in a radial direction with respect to said axis.

* * * * *